United States Patent
Gibson et al.

(10) Patent No.: US 10,161,259 B2
(45) Date of Patent: Dec. 25, 2018

(54) FLEXIBLE FILM-RIDING SEAL

(71) Applicant: General Electric Company, Schenectady, NY (US)

(72) Inventors: Nathan Evan McCurdy Gibson, Cincinnati, OH (US); Rahul Anil Bidkar, Niskayuna, NY (US); Azam Mihir Thatte, Arlington, MA (US); Narayana Shastry, Bangalore (IN); Hariharan Manickavasagam Sarojini, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/878,862

(22) Filed: Oct. 8, 2015

(65) Prior Publication Data

US 2016/0115805 A1    Apr. 28, 2016

Related U.S. Application Data

(60) Provisional application No. 62/069,513, filed on Oct. 28, 2014.

(51) Int. Cl.
*F01D 11/00* (2006.01)
*F16J 15/44* (2006.01)
(Continued)

(52) U.S. Cl.
CPC .............. *F01D 11/14* (2013.01); *F01D 11/02* (2013.01); *F01D 11/025* (2013.01); *F01D 11/08* (2013.01);
(Continued)

(58) Field of Classification Search
CPC ................................ F01D 11/16; F01D 11/001
(Continued)

(56) References Cited

U.S. PATENT DOCUMENTS 2,181,203 A    11/1939    Reynolds
3,559,725 A    2/1971    Pulick et al.
(Continued)

FOREIGN PATENT DOCUMENTS

CN    1910344 A    2/2000
EP    0629799 A    12/1994
(Continued)

OTHER PUBLICATIONS

Young, et al., "Roark's Formulas for Stress and Strain", McGraw-Hill, Seventh Edition, pp. 189-201, 2001.
(Continued)

*Primary Examiner* — Nicholas L Foster
*Assistant Examiner* — L. Susmitha Koneru
(74) *Attorney, Agent, or Firm* — General Electric Company; William Andes

(57) ABSTRACT

A seal apparatus for a rotary machine, including a plurality of sealing assembly segments surrounding a rotor element which is mounted for rotation about a longitudinal axis and has an outer surface. Each of the segments includes a shoe with one or more labyrinth teeth facing the outer surface and a shoe plate disposed downstream of the one or more labyrinth seal teeth and configured to generate an aerodynamic force between the shoe plate and the outer surface of the rotor element. The shoe is further configured to be flexible in a radial-axial plane in response to fluid film forces generated by interaction of the sealing assembly segment and the rotor element, and an axially-oriented beam spring connects the shoe to a stationary seal body.

7 Claims, 3 Drawing Sheets

(51) Int. Cl.
| | |
|---|---|
| *F01D 11/02* | (2006.01) |
| *F01D 11/16* | (2006.01) |
| *F01D 11/14* | (2006.01) |
| *F01D 11/08* | (2006.01) |
| F01D 11/04 | (2006.01) |
| F01D 11/10 | (2006.01) |
| F01D 11/12 | (2006.01) |

(52) U.S. Cl.
CPC ............. *F01D 11/16* (2013.01); *F16J 15/441* (2013.01); *F01D 11/001* (2013.01); *F01D 11/04* (2013.01); *F01D 11/10* (2013.01); *F01D 11/12* (2013.01)

(58) Field of Classification Search
USPC ................. 415/173.3, 173.5, 174.2, 174.5
See application file for complete search history.

(56) References Cited

U.S. PATENT DOCUMENTS

| | | | |
|---|---|---|---|
| 3,809,443 A | 5/1974 | Cherubim | |
| 4,223,958 A | 9/1980 | Gray | |
| 4,513,567 A | 4/1985 | Deveau et al. | |
| 5,100,158 A | 3/1992 | Gardner | |
| 5,244,216 A | 9/1993 | Rhode | |
| 5,370,402 A | 12/1994 | Gardner et al. | |
| 5,427,455 A | 6/1995 | Bosley | |
| 5,632,493 A | 5/1997 | Gardner | |
| 5,791,868 A | 8/1998 | Bosley et al. | |
| 5,797,723 A | 8/1998 | Frost et al. | |
| 5,833,369 A | 11/1998 | Heshmat | |
| 5,902,049 A | 5/1999 | Heshmat | |
| 5,915,841 A | 6/1999 | Weissert | |
| 5,954,477 A | 9/1999 | Balsdon | |
| 6,145,843 A | 11/2000 | Hwang | |
| 6,390,476 B1 | 5/2002 | Tong et al. | |
| 6,402,466 B1* | 6/2002 | Burdgick | F01D 9/04 277/630 |
| 6,505,837 B1 | 1/2003 | Heshmat | |
| 6,527,274 B2 | 3/2003 | Herron et al. | |
| 6,540,231 B1* | 4/2003 | Trantow | F01D 11/02 277/355 |
| 6,547,257 B2* | 4/2003 | Cromer | F01D 9/023 277/355 |
| 6,655,696 B1 | 12/2003 | Fang et al. | |
| 6,811,154 B2 | 11/2004 | Proctor et al. | |
| 6,840,519 B2 | 1/2005 | Dinc et al. | |
| 7,044,470 B2 | 5/2006 | Zheng | |
| 7,226,053 B2 | 6/2007 | Nakano et al. | |
| 7,261,300 B2* | 8/2007 | Agrawal | F16C 17/042 277/399 |
| 7,320,468 B2* | 1/2008 | Morgan | F01D 11/001 277/400 |
| 7,614,792 B2 | 11/2009 | Wade et al. | |
| 7,726,660 B2 | 6/2010 | Datta | |
| 8,002,285 B2 | 8/2011 | Justak | |
| 8,074,997 B2 | 12/2011 | Garrison et al. | |
| 8,113,771 B2 | 2/2012 | Turnquist et al. | |
| 8,388,311 B2 | 3/2013 | Yamaguchi et al. | |
| 9,045,994 B2 | 6/2015 | Bidkar et al. | |
| 9,255,642 B2 | 2/2016 | Bidkar et al. | |
| 2002/0192074 A1 | 12/2002 | Turnquist et al. | |
| 2003/0071422 A1 | 4/2003 | Holder | |
| 2003/0102630 A1 | 6/2003 | Dinc et al. | |
| 2003/0131602 A1 | 7/2003 | Ingistov | |
| 2004/0007823 A1* | 1/2004 | Brauer | F01D 11/003 277/421 |
| 2004/0046327 A1 | 3/2004 | Menendez et al. | |
| 2004/0119238 A1 | 6/2004 | Skumawitz et al. | |
| 2004/0207158 A1 | 10/2004 | Agrawal et al. | |
| 2005/0200080 A1 | 9/2005 | Baghdadi et al. | |
| 2005/0248100 A1 | 11/2005 | Gendraud et al. | |
| 2007/0132193 A1 | 6/2007 | Wolfe et al. | |
| 2008/0003099 A1 | 1/2008 | Giesler et al. | |
| 2008/0018054 A1* | 1/2008 | Herron | F01D 11/02 277/409 |
| 2008/0197575 A1* | 8/2008 | El-Aini | F01D 11/02 277/303 |
| 2008/0265513 A1* | 10/2008 | Justak | F01D 11/025 277/301 |
| 2008/0309019 A1 | 12/2008 | Wolfe et al. | |
| 2009/0016881 A1 | 1/2009 | Baldauf et al. | |
| 2009/0066033 A1 | 3/2009 | Lusted et al. | |
| 2009/0160135 A1 | 6/2009 | Turini et al. | |
| 2009/0196743 A1* | 8/2009 | Ueno | F01D 11/003 415/174.5 |
| 2010/0007093 A1 | 1/2010 | Grondahl | |
| 2010/0143101 A1 | 6/2010 | Fang et al. | |
| 2011/0103939 A1 | 5/2011 | Zhang et al. | |
| 2011/0121519 A1 | 5/2011 | Justak | |
| 2011/0304101 A1* | 12/2011 | Grondahl | F01D 11/02 277/411 |
| 2012/0193875 A1 | 8/2012 | Deo et al. | |
| 2012/0223483 A1* | 9/2012 | Bidkar | F01D 11/025 277/301 |
| 2012/0243977 A1* | 9/2012 | Simonet | F01D 9/041 415/173.3 |
| 2012/0251290 A1* | 10/2012 | Turnquist | F01D 11/001 415/1 |
| 2013/0058765 A1 | 3/2013 | Zheng et al. | |
| 2013/0234399 A1* | 9/2013 | Justak | F01D 11/025 277/411 |
| 2014/0117624 A1* | 5/2014 | Bidkar | F16J 15/447 277/350 |
| 2014/0119912 A1 | 5/2014 | Bidkar et al. | |
| 2015/0003972 A1* | 1/2015 | Lim | F02C 7/28 415/173.2 |
| 2015/0097342 A1 | 4/2015 | Morreale et al. | |

FOREIGN PATENT DOCUMENTS

| | | |
|---|---|---|
| EP | 2495398 A2 | 9/2012 |
| JP | H02113068 U | 9/1990 |
| JP | H0914458 A | 1/1997 |
| JP | 2001323804 A | 11/2001 |
| JP | 2014015927 A | 1/2014 |
| JP | 2016502618 A | 1/2016 |
| KR | 20120021681 A | 3/2012 |
| WO | 2012052740 A1 | 4/2012 |
| WO | 2014022290 A1 | 2/2014 |

OTHER PUBLICATIONS

European Search Report and Opinion issued in connection with Corresponding EP Application No. 15191185.6 dated Apr. 7, 2016.

Shellef et al., "A Bi-Directional Gas Face Seal", Tribology Transactions, vol. No. 35, Issue No. 1, pp. 53-58, 1992.

Munson, "Compressor Discharge Film Riding Face Seals", National Aeronautics and Space Administration, pp. 219-226, Jul. 1, 1994.

Steinetz et al., "Advanced Seal Technology Role in Meeting Next Generation Turbine Engine Goals", National Aeronautics and Space Administration, pp. 1-13, Feb. 1999.

Uth, "Advanced Aerodynamic Sealing System for Thermo Turbo Machinery", International Joint Power Generation Conference collocated with TurboExpo 2003, pp. 553-560, Jun. 16-19, 2003.

Kim et al., "Aerodynamic Performance of Double-Sided Labyrinth Seals", The 4th international Symposium on Fluid Machinery and Fluid Engineering, pp. 377-382, Nov. 24-27, 2008.

Zhang et al., "Influence of Rotor Axial Shifting and Clearance on Leakage in Stepped Seal in Steam Turbines", 2010 Asia-Pacific Power and Energy Engineering Conference (APPEEC), IEEE, pp. 1-4, Mar. 28-31, 2010.

Meng et al., "Influence of Tooth Position and Clearances on Leakage in Labyrinth Seal in Turbine", 2011 Asia-Pacific Power and Energy Engineering Conference (APPEEC), IEEE, pp. 1-6, Mar. 25-28, 2011.

Ya et al., "Numerical Simulation and Characteristics Analysis of the Turbine Shaft End Spiral Groove Mechanical Seal", 2012 Third

(56) References Cited

OTHER PUBLICATIONS

International Conference on Digital Manufacturing and Automation (ICDMA), pp. 558-561, Jul. 31, 2012-Aug. 2, 2012.

Nyserda, "Development of Pressure Actuated Leaf Seals for Improved Turbine Shaft Sealing(ST9887-1)", Retrieved from "http://www.nyserda.ny.gov/BusinessAreas/Energy-Innovation-and-Business-Development/Research-and-Development/Research-Project/Research-Projects/Research-Project-Search-Results/Project-Information.aspx?p=5032&R=1&PDF=true", Nyserda Energy Innovation solutions, pp. 1-2, Aug. 1, 2013.

PCT Search Report and Written Opinion issued in connection with Related PCT Application No. PCT/US2013/067356 dated Jan. 30, 2014.

PCT International Preliminary Report on Patentability issued in connection with Related PCT Application No. US2013/067356 dated May 5, 2015.

Unofficial English Translation of Chinese Office Action issued in connection with Related CN Application No. 201380068961.X dated Dec. 3, 2015.

Unofficial English Translation of Chinese Office Action issued in connection with corresponding CN Application No. 201510710008.1 dated Sep. 20, 2016.

Unofficial English Translation of Japanese Search Report issued in connection with corresponding JP Application No. 2015205972 dated Dec. 14, 2016.

Unofficial English Translation of Japanese Office Action issued in connection with corresponding JP Application No. 2015205972 dated Jan. 10, 2017.

U.S. Appl. No. 14/325,452, filed Jul. 8, 2014, Rahul Anil Bidkar et al.

U.S. Appl. No. 14/045,083, filed Oct. 3, 2013, Rahul Anil Bidkar et al.

U.S. Appl. No. 13/665,431, filed Oct. 31, 2012, Rahul Anil Bidkar et al.

\* cited by examiner

FLEXIBLE FILM-RIDING SEAL

CROSS-REFERENCE TO RELATED APPLICATION

This non-provisional application claims the benefit of priority under 35 U.S.C. § 119(e) to U.S. Provisional Patent Application No. 62/069,513, entitled "FLEXIBLE FILM-RIDING SEAL", filed Oct. 28, 2014, which is herein incorporated in its entirety by reference.

BACKGROUND OF THE INVENTION

This invention relates generally to seal assemblies for turbomachinery and more particularly relates to film riding seal assemblies for sealing rotor-stator gaps and the like.

Various types of turbomachinery, such as gas turbine engines, aircraft engines, and steam turbines are known and widely used for power generation, propulsion, and the like. The efficiency of the turbomachinery depends in part upon the clearances between the internal components and the leakage of primary and secondary fluids through these clearances. For example, large clearances may be intentionally allowed at certain rotor-stator interfaces to accommodate large, thermally or mechanically-induced, relative motions. Leakage of fluid through these gaps from regions of high pressure to regions of low pressure may result in poor efficiency for the turbomachinery. Such leakage may impact efficiency in that the leaked fluids fail to perform useful work.

Different types of sealing systems are used to minimize the leakage of fluid flowing through turbomachinery. The sealing systems, however, often are subject to relatively high temperatures, thermal gradients, and thermal and mechanical expansion and contraction during various operational stages that may increase or decrease the clearance therethrough. For example, traditional labyrinth seals that are assembled to run very tight clearance during a start-up transient phase might run with large clearances during steady state operations, thereby leading to poor performance at steady state operation.

One known type of seal that improves on the performance of a labyrinth seal is a "film-riding" seal in which a stator portion of the seal rides on a thin film of air, allowing it to track a rotor portion of the seal. For this type of seal to function properly it must be able to generate sufficient lift to achieve an equilibrium between the air film force and a spring force. Because of its very small thickness the air film force is very sensitive to distortion of the rotor or stator due to operating conditions (centrifugal force, uneven temperature distribution, etc.). As the relative distortion between the stator and rotor increases the load bearing capacity of the seal air film drops, and contact can take place. Prior art designs make use of rigid lifting geometry which could not conform to any distortions. This prevents the seal from generating enough force to prevent contact.

Accordingly, there remains a need for a film-riding seal that is tolerant to distortion of the rotor surface, allowing for a robust seal.

BRIEF DESCRIPTION OF THE INVENTION

This need is addressed by the present invention, which provides a film-riding foil seal which is flexible so as to be able to accommodate variations in the shape of an opposing sealing surface.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
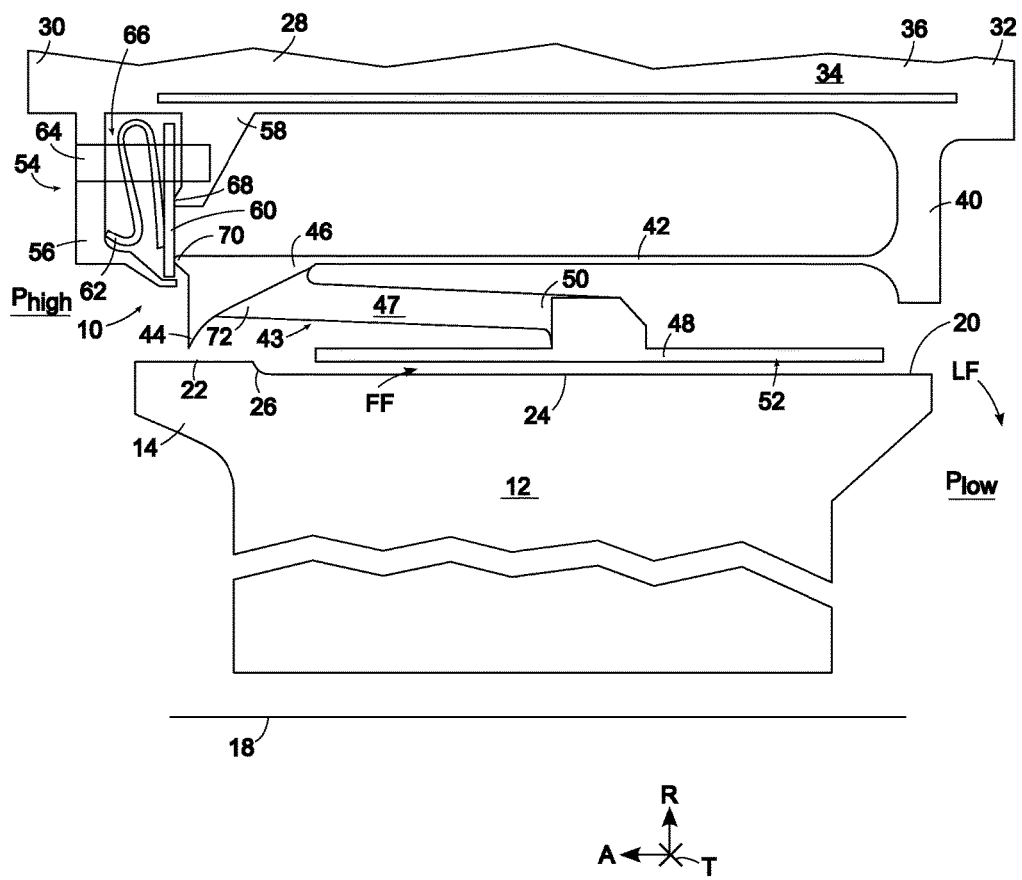
FIG. 1 is a cross-sectional view of a film-riding seal assembly of a rotary machine constructed in accordance with an embodiment of the present invention, in a static condition.

Referring to the drawings wherein identical reference numerals denote the same elements throughout the various views, FIG. 1 depicts an exemplary seal assembly 10 constructed in accordance with an aspect of the present invention.

The seal assembly 10 interacts with a rotor element 12 having forward and aft ends 14, 16 respectively, mounted for rotation about a longitudinal axis 18.

Figure 2:
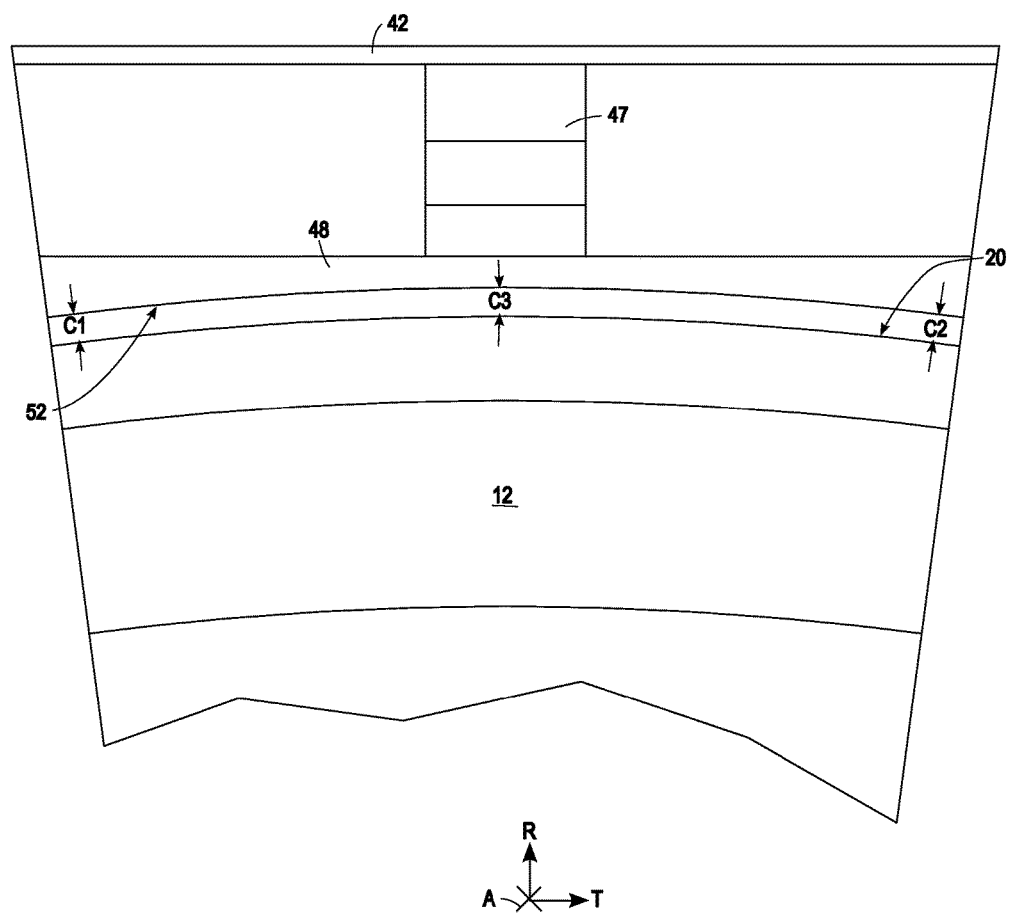
FIG. 2 is an aft elevational view the seal assembly of FIG. 1.

It is noted that, as used herein, the term "axial" or "longitudinal" refers to a direction parallel to an axis of rotation of a gas turbine engine or other turbine machine, while "radial" refers to a direction perpendicular to the axial direction, and "tangential" or "circumferential" refers to a direction mutually perpendicular to the axial and tangential directions. (See arrows "A", "R", and "T" in FIGS. 1 and 2). As used herein, the terms "forward" or "front" refer to a location relatively upstream in an air flow passing through or around a component, and the terms "aft" or "rear" refer to a location relatively downstream in an air flow passing through or around a component. The direction of this flow is shown by the arrow "F" in FIG. 1. These directional terms are used merely for convenience in description and do not require a particular orientation of the structures described thereby.

In practice, the rotor element 12 may be incorporated into or mounted to a shaft, disk, or other rotating element (not shown). The rotor element 12 has an arcuate outer surface 20 which functions as part of a sealing interface, as described in more detail below. The outer surface 20 may include a cylindrical forward section 22 with a first radius and a cylindrical aft section 24 with a second, smaller radius. The aft section 24 may also be described as being recessed relative to the forward section 22, and an aft-facing step 26 is defined at the intersection of the forward and aft sections 22 and 24. In operation, the rotor element 12 and seal assembly 10 are exposed to airflow at a first, relatively higher static air pressure "Phigh" adjacent the forward end 14, and airflow at a second, relatively lower static air pressure "Plow" adjacent the aft end 16. In the absence of the seal assembly 10 the differential between Phigh and Plow tends to drive a leakage flow, denoted with an arrow "LF", and the purpose and function of the seal assembly 10 to is reduce such leakage flow.

The seal assembly 10 includes a seal body 28 having forward and aft ends 30 and 32, positioned surrounding the rotor element 12. In practice the seal body would be mounted to or a part of surrounding stationary structure of a turbomachinery device. The seal body 28 may be a single continuous ring, or it may comprise an annular array of segments which collectively defining a complete ring. In the illustrated example, the seal body 28 is segmented. Each segment has end faces 34 and may include seal slots 36 configured to receive spline seals of a known type (not shown) to seal leakage between adjacent end faces 34.

An aft flange 40 extends radially inwardly from the seal body 28 near its aft end. An array of beam-type springs 42 extend axially forward from the aft flange 40. A single spring 42 may be provided for each segment of the seal body 28.

A shoe 43 comprising one or more seal teeth, a beam 47, and a shoe plate is carried at the forward end 46 of each spring 42.

One or more arcuate labyrinth seal teeth 44 are disposed at the forward end of the shoe 43. A single seal tooth 44 is shown in this particular example (alternatively, two or more seal teeth 44 could be arranged in a parallel, axially-spaced arrangement). The seal tooth 44 extends radially inwards towards the rotor element 12 and terminates a small, predetermined distance from the outer surface 20 of the rotor element 12, specifically the forward section 22 of the outer surface 20.

The shoe 43 also includes a beam 47 extending aft and radially inward from the seal tooth 44. A shoe plate 48 is disposed at the aft end 50 of each of the beams 47. The shoe plate 48 has an arcuate inner surface 52. Along the axial direction, the inner surface 52 is flat and parallel to the outer surface 20 of the rotor element 12. Along the circumferential direction, the inner surface 52 is arcuate. In accordance with known principles of hydrodynamic bearing construction, the arcuate shape of the inner surface 52 is formed so as to define a circumferential gradient in the radial clearance between the inner surface 52 and the outer surface 20. In the illustrated example, best seen in FIG. 2, the radius of curvature of the inner surface 52 is intentionally machined to be larger than the radius of the outer surface 20 of the rotor element 12. For example, the radial clearance at peripheral locations "C1" and "C2" may be greater than the radial clearance at a central location "C3".

a secondary seal 54 is disposed near the forward end 30 of the seal body 28. The secondary seal 54 comprises a forward flange 56, a middle flange 58, a seal leaf 60, a backing spring 62, and a pin 64. The seal leaf 60 is disposed in a pocket 66 defined between the forward and middle flanges 56 and 58. The backing spring 62 is also disposed in the pocket 66 and is arranged to urge the seal leaf 60 axially aft, so that it bears against an outer lip 68 of the middle flange 58, and also an inner lip 70 of the shoe 43. The pin 64 extends axially through the flanges 56, 58, the backing spring 62, and the seal leaf 60 to retain the secondary seal 54 together. The secondary seal 54 may be configured as a ring of segments, for example there being one seal leaf 60, backing spring 62, and pin 64 provided for each segment of the seal assembly 10.

In a non-limiting example, the components of the seal assembly 10 (i.e. the body 28, spring 42, beam 47, and shoe plate 48), as well as the rotor element 12 and the secondary seal 54 may be made from one or more known high-temperature metal alloys. Each segment of the seal assembly 10 may be built up from individual component which are fabricated and then joined together using processes such as brazing or welding. Alternatively, all or part of the seal assembly 10 may be of unitary construction, for example being machined from a single block of metal.

Optionally, the shoe plate 48 may be coated with a lubricating and/or wear-resistant coating, such as a base of chromium, nickel, molybdenum along with hard phases and solid lubricants. In another non-limiting example, the coating may comprise cobalt-based alloys. Such coatings can prevent damage during unintentional rubs between the shoe plate 48 and the rotor element 12. Optionally, the outer surface 20 of the rotor element 12 may be coated with chromium carbide or tungsten carbide or similar coatings to improve the rotor's hardness, corrosion resistance and the ability to maintain a good surface finish.

During operation, when the rotor element-to-shoe gap starts reducing (e.g. during a thermal transient event causing clearance change), a thin fluid film "FF" starts building additional pressure. As a consequence, when the rotor-shoe plate gap becomes small (typically less than 1/1000 inch), the fluid film FF is either monotonically converging or converging-diverging in the direction of rotation. This fluid film in a form of fluid wedge causes additional pressure to build-up. The physics of thin film is well understood from hydrodynamic journal bearings or foil bearings, and can be modeled using appropriate fluid flow models. The basic principle is that any negative gradient in the fluid film thickness in the direction of rotation will increase the pressure in the fluid film above its boundary pressure. The additional pressure caused by the thin fluid film deflects the spring 42, moving the shoe plate 48 radially outwards and keeping the rotor element 12 from contacting the shoe plate 48. In this sense, any outward excursion of the rotor element 12 is tracked by the shoe plate 48. Stated another way, because the seal tooth 44 is physically linked to the shoe plate 48 by the beam 47, the seal tooth 44 deflects in unison with the shoe plate 48. This action ensures that the seal tooth 44 will not contact the outer surface 20 of the rotor element 12 during operation. The presence of the aft-facing step 26 ensures that the primary pressure drop occurs across the labyrinth seal tooth 44, and that high-velocity air flow does not disrupt the fluid film FF.

Figure 3:
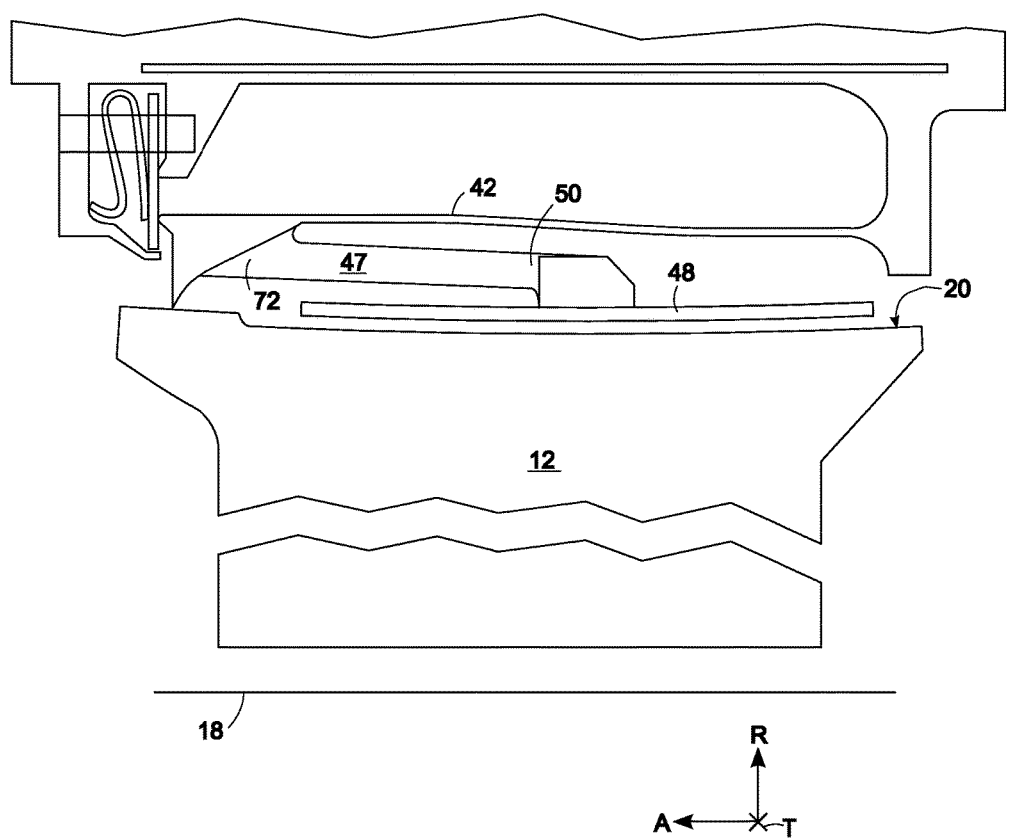
FIG. 3 is a cross-sectional view of the seal assembly of FIG. 1 in a deflected condition.

The forward and aft ends 72 and 50 of the beam 47 are rigidly coupled to the forward end 46 of the spring 42 and to the shoe plate 48, respectively. The shape and dimensions of the beam 47 are selected such that radial deflection of the shoe plate 48 is constrained a much as possible to pure radial movement (that is, without rotation and without translation along non-radial axes). Stated another way, the arrangement resists longitudinal tilting of the shoe plate 48. More specifically, a radially-outward force acting on the aft end 50 of the beam 47 results in both a radially outward deflection of the spring 42, and a moment on the forward end 46 of the spring 42. As shown in FIG. 3, this moment counters the natural bending shape of the spring 42 which would tend to tilt the shoe plate 48, and instead causes the spring 42 to deflect in a shallow "S"-shape. To achieve the proper compensation, the beam 47 is approximately half the axial length of the spring 42.

In operation, the rotor element 12 is subject to thermal and mechanical distortion. As seen in FIG. 3, this can cause the shape of the outer surface 20 to change from a basically cylindrical shape to an arcuate shape. If the shoe were rigid, as in prior art designs, this would cause the rotor-element-to-shoe gap to vary over the length of the shoe plate 48, with the gap being too large and reducing the lift force on the shoe in some locations, and the gap being too small and risking contact between the shoe plate 48 and the outer surface 20.

To address this tendency, the shoe plate 48 is made compliant or flexible. To accomplish this, the overall dimensions of the shoe plate 48, including its thickness, are selected such that it will have significant flexibility in an axial-radial plane, when subjected to normal mechanical and pressure forces during operation. During operation, the fluid film FF generates a greater force at the locations where a smaller gap is present (for example when the outer surface 20 is curved because of thermal gradients). This increased force acting at a distance from the aft end of the beam 47, in opposition to the spring force, causes the shoe plate 48 to distort and match the shape of the outer surface, equalizing the size of the gap. In FIG. 3, the shoe plate 48 is shown deflected in a concave-outward shape. When the outer surface 20 reverts to a nominal cylindrical shape, the shoe plate 48 reverts to its static shape as well. The compliance function is thus self-regulating. As used herein, the terms "compliant" or "flexible" used in reference to the shoe plate 48 imply that its stiffness is sufficiently low to be distorted solely by forces generated in normal operation of the seal assembly 10. The magnitude of these forces will vary depending on the specific application, but are typically on the order of a few pounds.

In operation, the secondary seal 54 is held initially against the inner and outer lips 70, 68 by pressure of the backing spring 62. The pressure difference (Phigh-Plow) increases the contact load. During operation the rotor 12 will tend to close down on the seal due to centrifugal growth and thermal mismatch between the rotor 12 and the stator. Rotor outer surface 20 will move towards the shoe plate 48 causing it to move radially outward. This reduces the distance between outer and inner lips 68 and 70, shrinking the pressure loaded area, reducing pressure load on the seal leaf 60 and minimizing friction between the seal tooth 44 and the secondary seal 54.

The seal assembly 10 described above has several advantages over prior art film-riding seals. By switching a rigid stator lifting geometry to a flexible geometry, the seal can conform to rotor distortions, increasing the lift capacity of the seal. Another problem that this invention addresses is the backing spring. Furthermore, the beam spring 42 can provide an acceptable amount of radial travel, spring stiffness, and stresses even when high radial and axial loads are applied. Finally, the leaf-type secondary seal is much more accepting of build tolerances than other types of seals.

The foregoing has described a flexible film-riding seal. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends any novel one, or any novel combination, of the features disclosed in this specification (including any accompanying potential points of novelty, abstract and drawings), or to any novel one, or any novel combination, of the steps of any method or process so disclosed.

What is claimed is:

1. A seal apparatus for a rotary machine, comprising:
    a rotor element which is mounted for rotation about a longitudinal axis and has an outer surface;
    a plurality of sealing assembly segments surrounding the rotor element, each of the segments comprising:
    a shoe including:
        one or more labyrinth seal teeth facing the outer surface, the one or more labyrinth seal teeth terminating a small, predetermined distance from the outer surface and not contacting the outer surface, and an inner lip disposed at a distal end of the shoe and oriented perpendicular to the one or more seal teeth; and
    a shoe plate axially spaced from and disposed downstream of the one or more labyrinth seal teeth, the shoe plate not contacting the outer surface and being configured to generate an aerodynamic force between the shoe plate and the outer surface of the rotor element, wherein the shoe is further configured to be flexible in a radial-axial plane in response to fluid film forces generated by interaction of the sealing assembly segment and the rotor element;
    a stationary seal body, the seal body having forward and aft ends and an aft flange extending radially inwardly from the seal body near the aft end;
    an axially-oriented beam spring extending between an axially forward end and an axially rearward end, the beam spring having the axially rearward end joined to the aft flange and extending axially forward from the aft flange; and
    a beam interconnecting the shoe plate and the beam spring so as to prevent longitudinal tilting of the shoe plate, wherein the beam is axially-oriented, with a forward end joined to the axially forward end of the spring, and an aft end joined to the shoe plate, the beam extending generally parallel to the beam spring such that the beam and the beam spring collectively form a U-shape, wherein the beam, the shoe plate, and the beam spring are all part of a unitary whole.

2. The seal apparatus of claim 1 wherein the seal body comprises an annular array of segments.

3. The seal apparatus of claim 1 further including a secondary seal including a leaf contacting the seal body and the shoe at upstream ends thereof, so as to seal leakage therebetween while permitting relative movement of the seal body and the shoe.

4. A rotary machine apparatus, comprising:
    a rotor element mounted for rotation about a longitudinal axis, the rotor element having a cylindrical outer surface,
    an annular stationary seal body surrounding the rotor element, the seal body having forward and aft ends and an aft flange extending radially inwardly from the seal body near the aft end;
    an array of axially-oriented beam springs each extending between an axially forward end and an axially rearward end and further having the axially rearward end attached to the aft flange and extending axially forward from the aft flange;
    a shoe coupled to each of the beam springs, disposed between the rotor element and the seal body, each shoe comprising:
    an annular labyrinth seal tooth facing the outer surface, the annular labyrinth seal tooth terminating a small, predetermined distance from the outer surface, and an inner lip disposed at a distal end of the shoe and oriented perpendicular to the labyrinth seal tooth;
    a shoe plate axially spaced from and disposed downstream of the labyrinth seal tooth, the shoe plate not contacting the outer surface and being configured to generate an aerodynamic force between the shoe plate and the outer surface, wherein the shoe is further configured to be flexible in a radial-axial plane in response to fluid film forces generated by interaction of the shoe plate and the rotor element; and a beam interconnecting the seal tooth and the shoe plate so as to prevent longitudinal tilting of the shoe plate, wherein the beam is axially-oriented, with a forward end joined to the axially forward end of the spring, and an aft end joined to the shoe plate, the beam extending generally parallel to the beam spring so that the beam and the beam spring form a U-shape, wherein the beam, the shoe plate, and the beam spring are all part of a unitary structure.

5. The apparatus of claim 4 wherein the seal body comprises an annular array of segments.

6. The apparatus of claim 4 further including a secondary seal including a leaf contacting the seal body and the shoe at upstream ends thereof, so as to seal leakage therebetween while permitting relative movement of the seal body and the shoe.

7. The apparatus of claim 4 wherein:
the outer surface includes a forward second and an aft section, with an aft-facing step defined therebetween;
the labyrinth tooth is disposed opposite the forward section; and
the shoe plate is disposed opposite the aft section.

\* \* \* \* \*